R. GUILLERY.
METHOD OF TESTING MATERIALS AND MACHINE EMBODYING THE SAME.
APPLICATION FILED APR. 2, 1920.
1,375,385.
Patented Apr. 19, 1921.
3 SHEETS—SHEET 1.
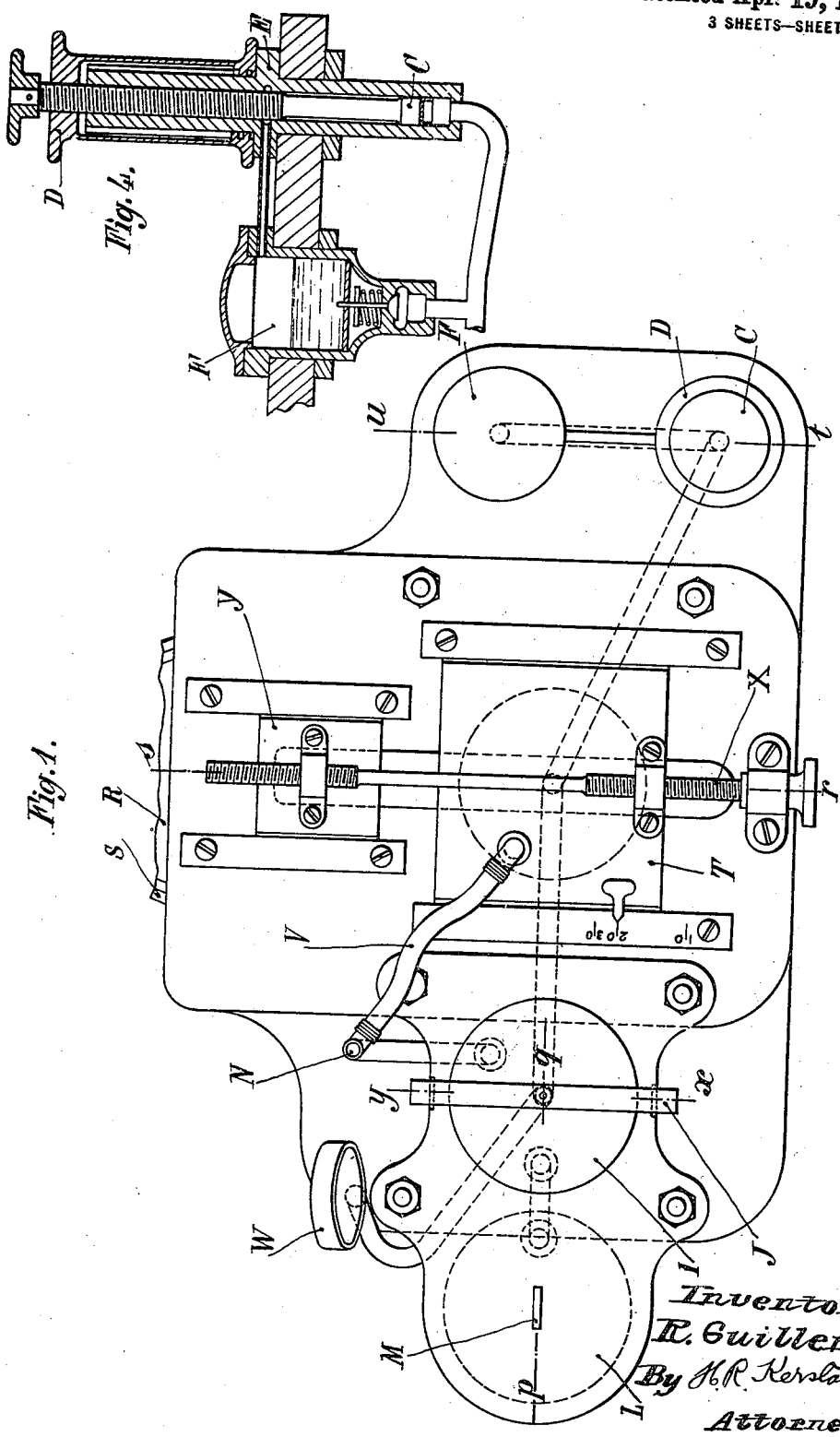

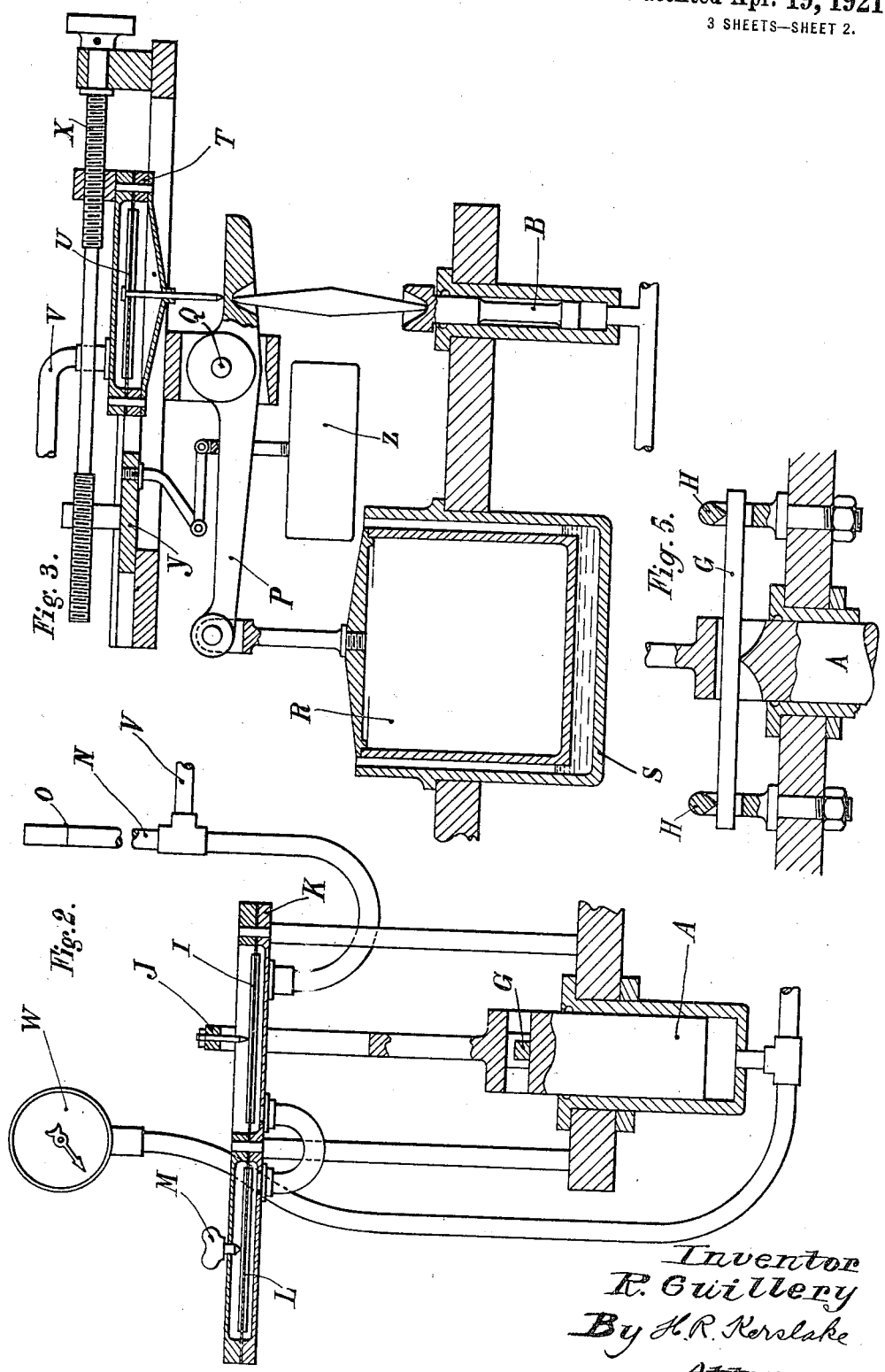

R. GUILLERY.
METHOD OF TESTING MATERIALS AND MACHINE EMBODYING THE SAME.
APPLICATION FILED APR. 2, 1920.

1,375,385.

Patented Apr. 19, 1921.
3 SHEETS—SHEET 3.

Inventor
R. Guillery
By H. R. Kerslake
Attorney

UNITED STATES PATENT OFFICE.

RENÉ GUILLERY, OF PARIS, FRANCE.

METHOD OF TESTING MATERIALS AND MACHINE EMBODYING THE SAME.

1,375,385.  Specification of Letters Patent.  Patented Apr. 19, 1921.

Application filed April 2, 1920. Serial No. 370,864.

*To all whom it may concern:*

Be it known that I, RENÉ GUILLERY, residing at Paris, (Seine Department,) No. 111 Rue de Flandre, citizen of the French Republic, have invented certain new and useful Improvements in Methods of Testing Materials and Machine Embodying the Same, which are fully set forth in the following specification.

This invention relates to a method of testing materials which allows of determining in a precise manner the termination of the period in which the deformations are proportional to the loads, and at the same time the modulus of elasticity of the material under test.

The invention is essentially characterized by the fact that the load representing the limit of proportionality between the deformation of a metal and the loads acting thereon, is determined by the observation of the compensation required in order to annul the variations of a certain volume of water which is subjected to an increase representing a function of the value of the elongation or the sag, and to a diminution which is a function of the value of the load.

The use of the limit of proportionality $e$ which is obtained in an exact manner, together with the modulus of elasticity $m$, will afford a means for obtaining the value $\frac{e^2}{m}$ which characterizes the elastic resilience, *i. e.*, the value which multiplied by a fraction of the volume of a metal (this being a fraction which varies according to the conditions of the stress) will give the amount of energy which this metal can absorb without being subjected to a permanent deformation.

The accompanying drawings represent by way of example a practical embodiment of the invention.

Figure 1 is a plan view of the machine used for bending tests.

Fig. 2 is a vertical section along the line $p-q$ passing through the axis of the piston employed for the bending tests.

Fig. 3 is a vertical section along the line $r-s$ passing through the axis of movement of the pressure balance system.

Fig. 4 is a vertical section along the line $t-u$ passing through the axis of the hand-operated piston and the supply tank.

Fig. 5 is a vertical section along the line $x-y$ passing through the axis of the piston used for bending tests.

Figure 6:
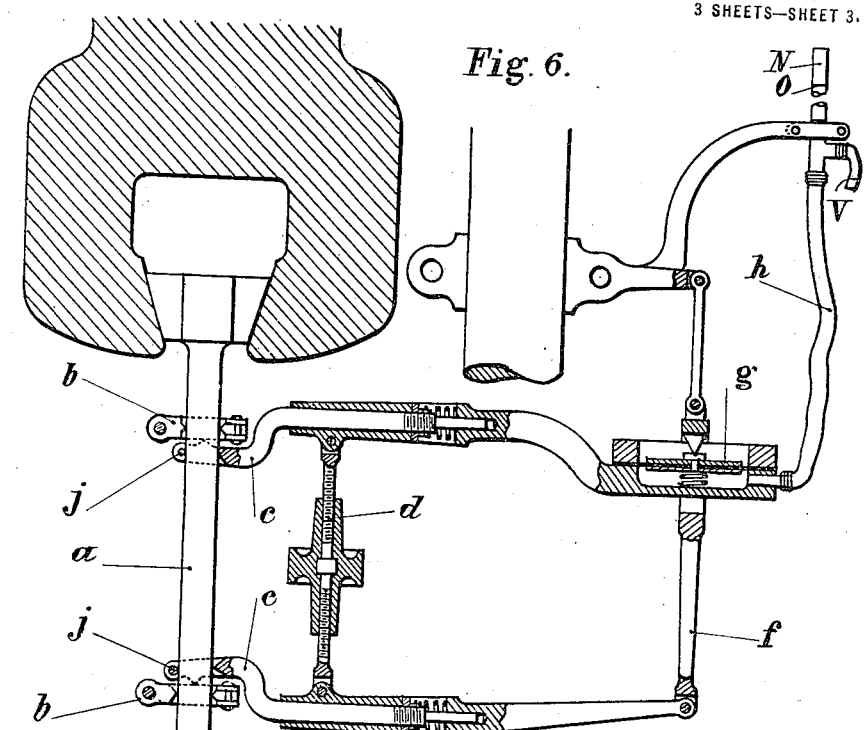
Fig. 6 is a view in elevation representing the system employed for transmission of elongations in a traction testing machine.

As disposed for bending tests, the device comprises two pistons A and B adapted to receive pressure which is exerted either by hand or by the use of an independent hydraulic pressure. Where hand pressure is used, the apparatus contains the piston C which is operated either by hand or by direct pressure, or again (after blocking the nut D, by means of a device with partial or cut-away screw-thread, upon the main body of the cylinder E) by screwing the piston into its nut D when thus blocked in the fixed position. This operating piston receives its liquid from a supply tank F which is fed by infiltration from the cylinders of the pistons A, B and C.

The piston A pushes against the test bar or specimen G which rests upon two supports H, these latter being represented in the present example as mounted upon the main frame of the machine.

The piston A which is used for bending purposes is caused to rest, through the intermediary of a pointed stud, Fig. 2 upon a circular diaphragm I, by the use of the frame J connected to the piston A. This diaphragm I is constituted by a metal disk attached to a sheet rubber disk, this latter being held in tight position at the outer part of a member K which forms a water chamber, the rubber disk having a somewhat larger diameter than the metal disk forming part of the diaphragm I. On the other hand, the said member K carries a second diaphragm L of the same kind as the foregoing, which constitutes a chamber in communication with the chamber of the diaphragm I and which is adjustable by means of the thumb screw M. The common reservoir thus constituted is also in communication with a glass tube N provided with a standard gage mark O.

The piston B pushes against a swinging lever P fulcrumed at Q and articulated at its other end to a cylindrical float R working within a cylindrical tank S containing mercury. The pressures upon the piston B, when acting in relation to the balance thus obtained, will give rise to piston movements which are proportional to the loads. Above the lever P is disposed a member T constituting a sliding carriage and provided with a diaphragm U of the same size as the diaphragm I, and the water chamber thus composed is caused to communicate through a flexible tube V with the fixed member K and consequently with the tube N.

The rod of the diaphragm U bears upon the flat upper surface of the lever P, and when the sliding carriage T is displaced by means of the screw X, a second portion screw-threaded in the contrary sense is caused to operate the sliding carriage $y$ which effects the displacement of the counterweight $z$ for the purpose of counterbalancing the pressure of the diaphragm U upon the lever P. The graduated scale on the guiding way of the sliding carriage T will indicate the scale number representing the modulus of elasticity, depending on the displacement of the said carriage.

Moreover, the pressure gage W connected with the pressure system will afford a means for determining the limiting load $e$.

The present device as adapted for bending tests operates in the following manner.

With the test bar or specimen disposed in the proper position and the diaphragm chambers being filled with water, the piston $c$ is operated in order to produce a certain pressure which is transmitted to the pistons A and B, and to the pressure gage W; due note is taken of the water level in the tube N, this level having been previously brought to the standard mark $o$ by means of the screw M. Should this lever rise or fall, the screw X is turned in the proper direction to reduce the displacement of the level, and this action is repeated as often as required.

When the level finally remains in a fixed position, this will show that the scale of loads corresponds to the scale of values of the sag or dip of the specimen, and the stationary position of the level indicates that the effect is proportional. The testing is continued by increasing the load up to the moment where the level becomes displaced, and this indicates that the conditions of proportionality have now ceased to prevail. The gage W shows the limit load $e$, while the position of the sliding carriage T indicates the value of the modulus $m$.

Figure 7:
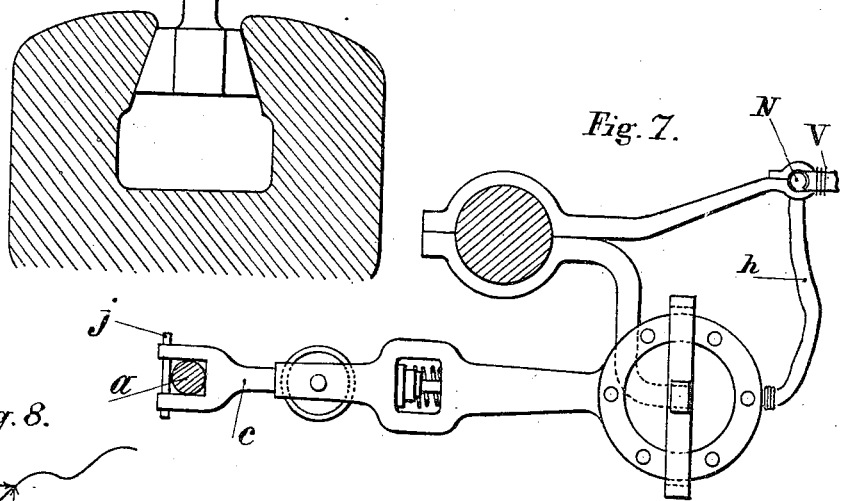
Fig. 7 is a plan view of the same transmission system.

Figs. 6 and 7 represent the manner in which the diaphragm I can be replaced by the diaphragm $g$ which transmits to the liquid contained in the glass tube N the elongations or the sag of the test bar or specimen which are transmitted to this diaphragm by the said test bar, the remainder of the apparatus remaining the same, it being understood that the motive pressure can be produced upon the piston B at the same time as upon the tractive piston, instead of being produced by hand operation on the piston G.

The method of operating is similar for the two tests in question.

Figure 8:
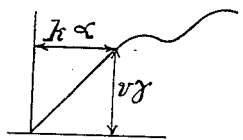
Fig. 8 is a diagram representing the curve of a traction test.
Figure 9:
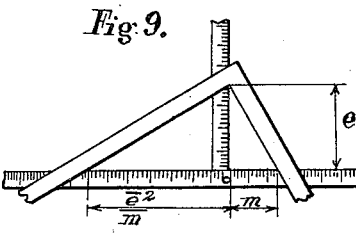
Fig. 9 represents the drawing method for determining the value of $\frac{e^2}{m}$ when $e$ and $m$ are known.

It is desirable that the relative dimensions of the members of the apparatus should be so designed that the displacements of the diaphragms acting in contrary sense on the water level of the tube should be in exact correspondence during the period of proportionality. For instance, in traction testing, it is required that the coefficient of elongations $k$ and the coefficient V of the loads constituting the series, shall be of such value that during the period of proportionality, the condition K=V shall always prevail, i. e., that the straight part of the traction curve shall be situated at 45 degrees as represented in the diagram Fig. 8. When the values of the limit $e$ and the modulus $m$ have been determined according to the tests, it will be an easy matter to find the value $\frac{e^2}{m}$. In Fig. 9 is shown the method by which a graduated T-rule and a square can be employed for obtaining this value in a rapid manner.

It is evident that various modifications can be made in this machine, and that the arrangement or the form of the members thereof can be varied without departing from the principle of the invention.

Having now described my invention, what I claim as new and desire to secure by Letters Patent is:

1. A method for testing material consisting in applying varying force to a test specimen of the material by means of fluid under pressure, causing such pressure to produce a proportional change in the volume of liquid in a container, causing the yield of the specimen to effect a proportional change in the volume of said container, then determining the limiting load for proportionality by observation of the amount of compensation required to annul the variations of the volume of liquid in said container subjected to an increase which is a function of the amount of elongation or of sag of the test specimen, and to diminution which is a function of the value of the load.

2. A method for testing materials consisting in first mounting a test specimen of the material, applying varying force to the test specimen of the material by means of fluid under pressure, causing such pressure to produce a proportional change in the volume of liquid in a container, causing the yield of the specimen to effect a proportional change in the volume of said container, then determining the limiting load for proportionality by observation of the amount of compensation required to annul the variations of the volume of the liquid in said container subjected to an increase which is a function of the amount of the elongation or of sag of the test specimen and to a diminution which is a function of the value of the load, and adjusting the level of the liquid so as to measure the coefficient of elasticity of the material.

3. A method of testing materials consisting in applying varying force to a test specimen of the material by means of fluid under pressure, simultaneously causing such pressure to produce a proportional change in the volume of liquid in a container, causing the yield of the specimen to effect a proportional change in the volume of said container, then determining the limiting load for proportionality by observation of the amount of compensation required to annul the variations of the volume of liquid in said container subjected to an increase which is a function of the amount of elongation or of sag of the test specimen, and to a diminution which is a function of the value of the load, and indicating the final pressure applied to said specimen.

4. An apparatus for testing materials comprising a pressure operated member adapted to bear against the specimen of material to be tested, a closed chamber having a plurality of movable diaphragms and a liquid volume indicating device, said member engaging one of said diaphragms and designed to permit movement of the same as the specimen yields under the pressure applied to said member, a second pressure operated member operatively connected with the second diaphragm and designed to move the same to decrease the volume of said chamber, means for applying equal pressure to said members and means for indicating the amount of pressure applied to said members.

In testimony whereof I have signed my name to this specification.

RENÉ GUILLERY.